United States Patent
Tran et al.

(10) Patent No.: US 10,208,588 B2
(45) Date of Patent: Feb. 19, 2019

(54) HIGH BITRATE DOWNHOLE TELEMETRY SYSTEM USING TWO INDEPENDENT CHANNELS ON A MULTI-CONDUCTOR CABLE

(71) Applicant: Halliburton Energy Service, Inc., Houston, TX (US)

(72) Inventors: Thanh Tran, Houston, TX (US); Boguslaw Wiecek, Kingwood, TX (US); Wei Sun, Houston, TX (US); John Terry, Annandale, VA (US); Jianqiang Zeng, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/327,756

(22) PCT Filed: Sep. 19, 2014

(86) PCT No.: PCT/US2014/056654
§ 371 (c)(1),
(2) Date: Jan. 20, 2017

(87) PCT Pub. No.: WO2016/043778
PCT Pub. Date: Mar. 24, 2016

(65) Prior Publication Data
US 2017/0204722 A1    Jul. 20, 2017

(51) Int. Cl.
*E21B 47/12* (2012.01)
*E21B 17/00* (2006.01)
(Continued)

(52) U.S. Cl.
CPC ............ *E21B 47/12* (2013.01); *E21B 17/003* (2013.01); *H04Q 9/00* (2013.01); *E21B 49/00* (2013.01); *H04B 3/32* (2013.01); *H04Q 2209/30* (2013.01)

(58) Field of Classification Search
CPC ...................................................... E21B 47/12
See application file for complete search history.

(56) References Cited

U.S. PATENT DOCUMENTS 5,387,907 A    2/1995 Gardner et al.
5,444,184 A    8/1995 Hassel
(Continued)

FOREIGN PATENT DOCUMENTS

WO    2016043778 A1    3/2016

*Primary Examiner* — Amine Benlagsir
(74) *Attorney, Agent, or Firm* — Benjamin Fite; Parker Justiss, P.C.

(57) ABSTRACT

In an example implementation, communications between a downhole logging tool and surface computing subsystem can be provided through a cable that includes one or more electrical conductors. To allow multiple channels of data to be transmitted along a single multi-conductor cable, data can be divided into two or more different channels, and each channel of data can be transmitted along the conductors. Due to the length of the cable, the electrical conductors of the cable may be subject to strong capacitive and inductive coupling. As a consequence of this coupling, signals sent downhole along any two arbitrary conductors may be subject to distortion, and can produce significant "crosstalk" on the other conductors. The effects of crosstalk can be reduced in a variety of ways, for example using QR decomposition.

27 Claims, 11 Drawing Sheets

(51) Int. Cl.
*H04Q 9/00* (2006.01)
*E21B 49/00* (2006.01)
*H04B 3/32* (2006.01)

(56) References Cited

U.S. PATENT DOCUMENTS

| | | | |
|---|---|---|---|
| 2003/0011490 A1* | 1/2003 | Bailey | E21B 47/12 340/853.3 |
| 2005/0270171 A1* | 12/2005 | Quintero | G01V 11/002 340/853.1 |
| 2008/0218375 A1* | 9/2008 | Viswanathan | G01V 1/52 340/854.9 |
| 2008/0239937 A1* | 10/2008 | Erickson | H04L 25/03006 370/201 |
| 2011/0026362 A1 | 2/2011 | Tang et al. | |

* cited by examiner

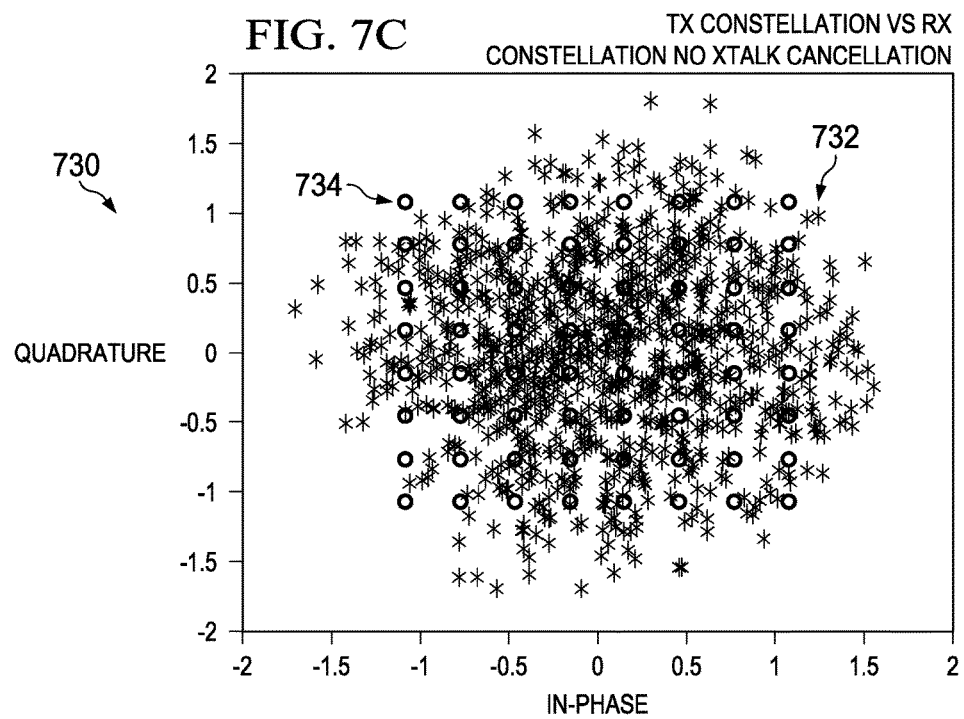
FIG. 7C  TX CONSTELLATION VS RX CONSTELLATION NO XTALK CANCELLATION
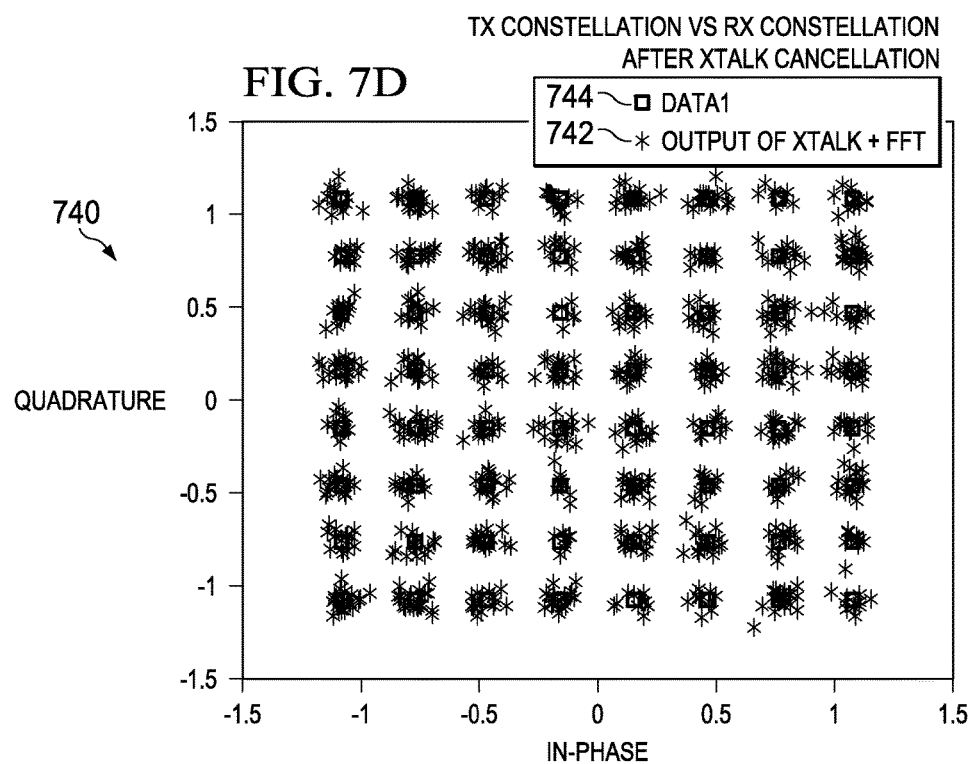
FIG. 7D  TX CONSTELLATION VS RX CONSTELLATION AFTER XTALK CANCELLATION

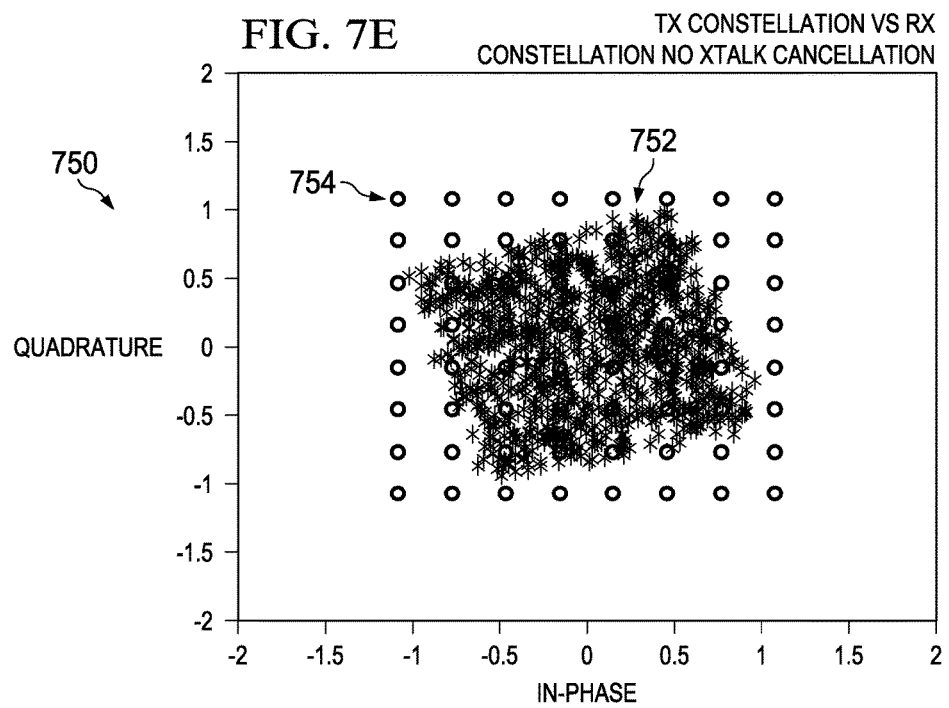
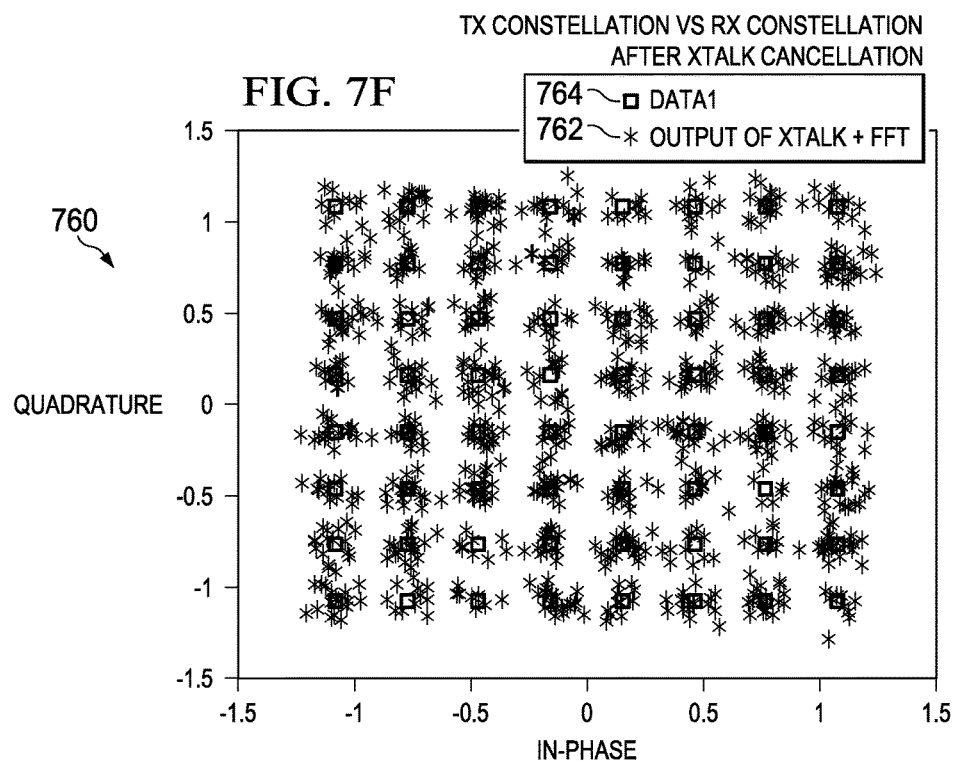

HIGH BITRATE DOWNHOLE TELEMETRY SYSTEM USING TWO INDEPENDENT CHANNELS ON A MULTI-CONDUCTOR CABLE

CROSS-REFERENCE TO RELATED APPLICATION

This application is the National Stage of, and therefore claims the benefit of, International Application No. PCT/US2014/056654 filed on Sep. 19, 2014, entitled "HIGH BITRATE DOWNHOLE TELEMETRY SYSTEM USING TWO INDEPENDENT CHANNELS ON A MULTI-CONDUCTOR CABLE," which was published in English under International Publication Number WO 2016/043778 on Mar. 24, 2016. The above application is commonly assigned with this National Stage application and is incorporated herein by reference in its entirety.

TECHNICAL FIELD

The present disclosure relates to downhole digital data communications systems, and more specifically to communications systems for transferring telemetry data between downhole sensors and a surface installation.

BACKGROUND

Wells are commonly used to access regions below the earth's surface and to acquire materials from these regions. For instance, wells are commonly used to locate and extract hydrocarbons from underground locations. The construction of wells typically includes drilling a wellbore and constructing a pipe structure, often called "casing," within the wellbore. Upon completion, the casing provides access to the underground locations and allows for the transport of materials to the surface.

Before, during, and after construction of a well, a variety of tools are conventionally used to monitor various properties of the downhole environment. For example, instruments may be used to monitor the location and/or orientation of a bottomhole assembly during drilling of a wellbore. In another example, monitoring instruments may be lowered into the borehole, where they perform measurements of the downhole environment. Information from the downhole instruments can be transmitted to the surface using a telemetry system.

DESCRIPTION OF DRAWINGS

FIGS. 7A-F show symbols decoded by several example telemetry systems.

DETAILED DESCRIPTION

Figure 1A:
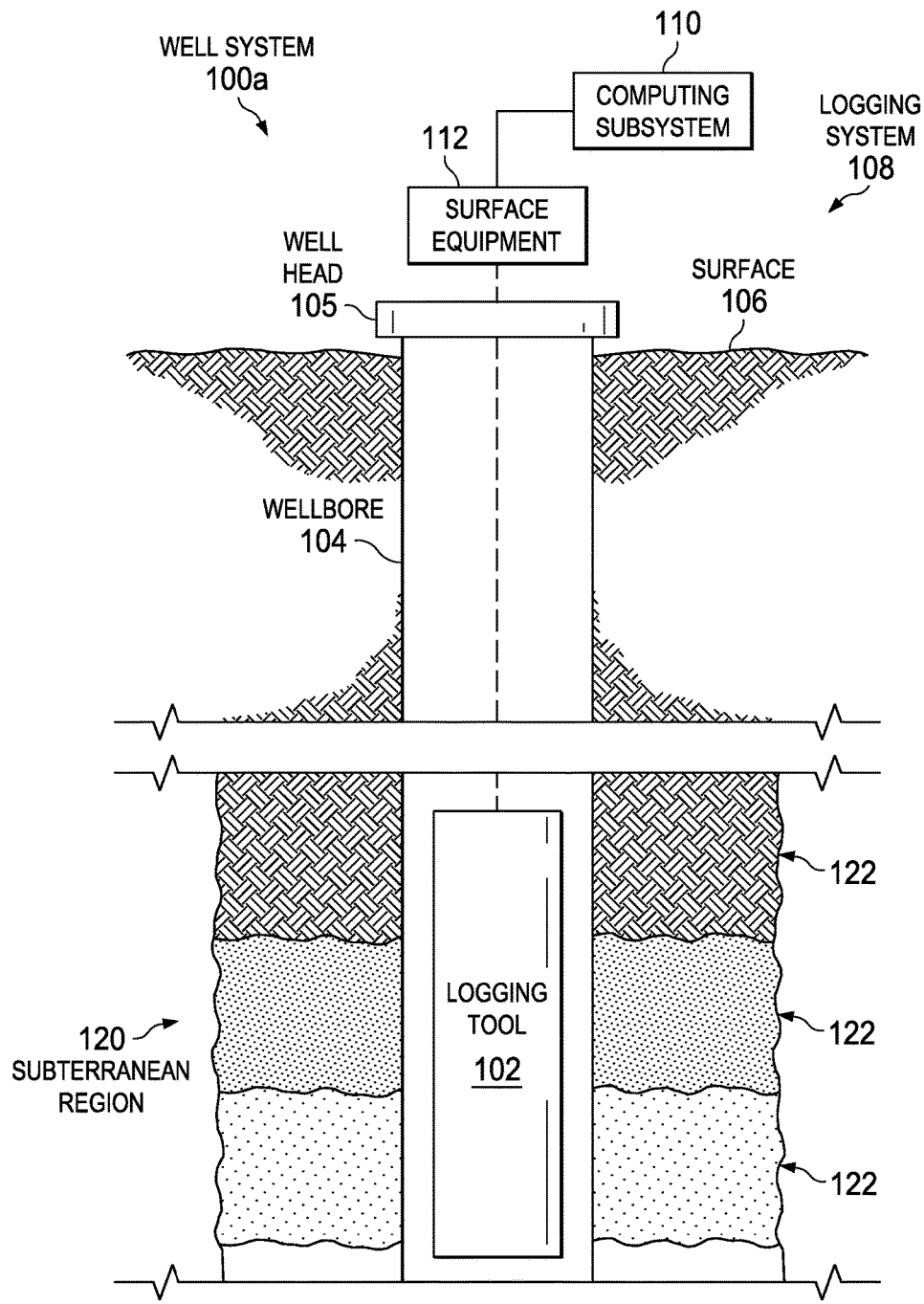
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these and other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of a logging system can be arranged and operated as represented in FIG. 1A or in another manner.

In some instances, all or part of the computing subsystem 110 can be implemented as a component of, or can be integrated with one or more components of, the surface equipment 112, the logging tool 102 or both. In some cases, the computing subsystem 110 can be implemented as one or more computing structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allows communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these and other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
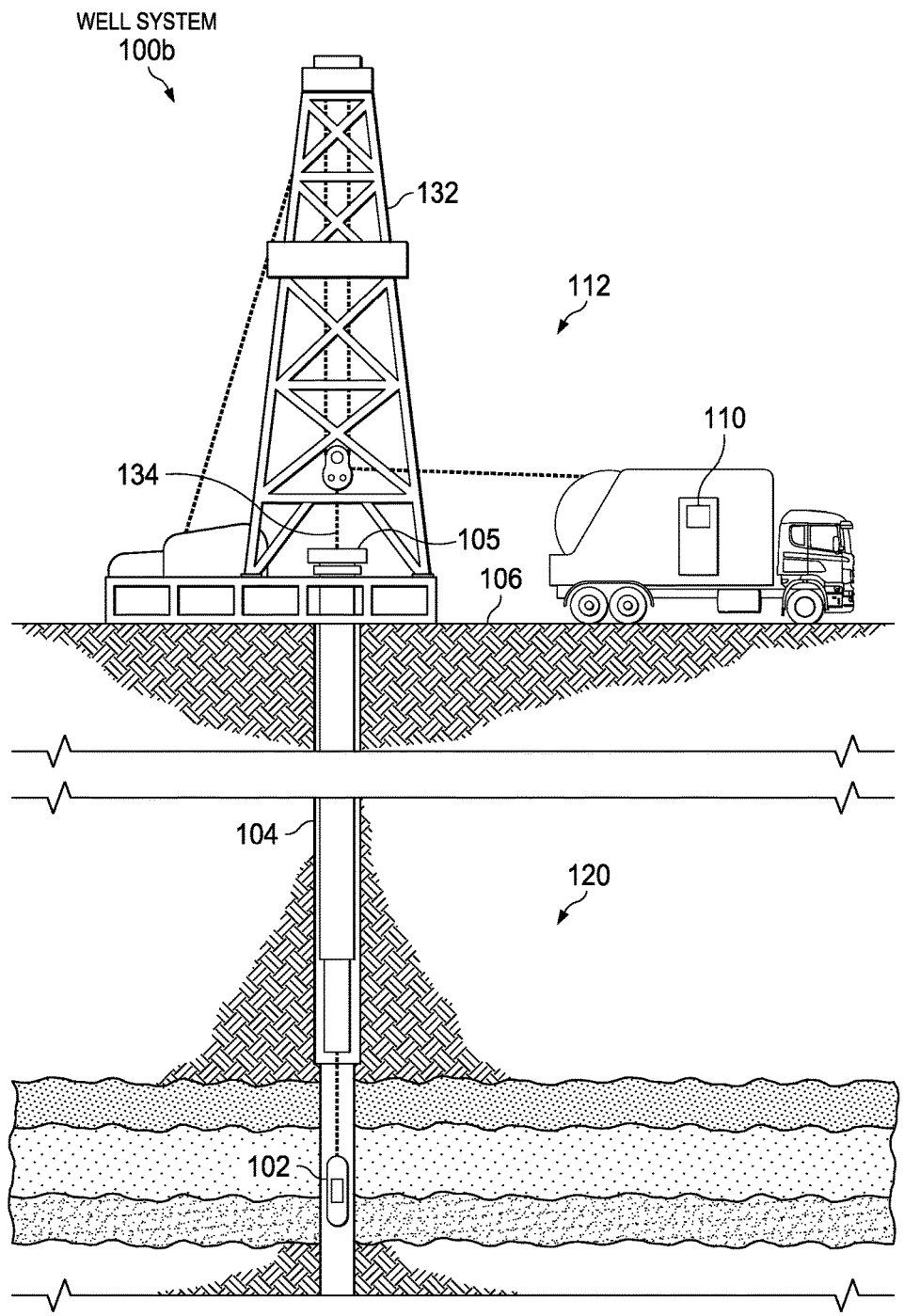
FIG. 1B is a diagram of an example well system that includes a logging tool in a wireline logging environment.

In some examples, logging operations are performed during wireline logging operations. FIG. 1B shows an example well system 100b that includes the logging tool 102 in a wireline logging environment. In some example wireline logging operations, the surface equipment 112 includes a platform above the surface 106 equipped with a derrick 132 that supports a wireline cable 134 that extends into the wellbore 104. Wireline logging operations can be performed, for example, after a drill string is removed from the wellbore 104, to allow the wireline logging tool 102 to be lowered by wireline or logging cable into the wellbore 104.

In some example implementations, the logging tool 102 includes one or more instruments for obtaining measurements from the subterranean region 120. As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest.

In some implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

In some implementations, logging system 108 can include one or more transceivers or similar apparatus for wired data communication among the various components. As an example, the logging tool 102 can receive commands, status signals, or other types of information from the computing subsystem 110 or another source through a wired connection between the two systems. In a similar manner, the computing subsystem 110 can receive telemetry data, logging data, status signals, or other types of information from the logging tool 102 or another source through a similar wired connection.

As an example, referring to FIG. 1B, communications between logging tool 102 and computing subsystem 110 can be provided through cable 134. Cable 134 can contain one or more conductors that carry electrical signals between transceivers in the logging tool 102 and computing subsystem 100, respectively. For example, in some implementations, measurement data from the logging tool 102 is encoded as electrical signals by a transceiver, and is transmitted along the conductors of cable 134 to computing subsystem 110. The transceiver of computing subsystem 110 receives these electrical signals, decodes the signals into data, and transmits the data to other components of computing subsystem 110 for analysis. In another example, the control signals from computing subsystem 110 are encoded as electrical signals by a transceiver, and are transmitted along the conductors of cable 134 to the logging tool 102. The transceiver of the logging tool 102 receives these electrical signals, decodes the signals into control signals, and transmits the control signals to the appropriate component of logging tool 102 for execution. In some implementations, the cable 134 can be connected via a transceiver to a power supply for supplying power to the logging tool 120. As an example, the power supply can be a programmable switching power supply configurable to produce adjustable voltages and waveforms under the control of computing subsystem 110. In some implementations, the cable 134 can be configured to safely deliver high electrical power and bi-directional telemetry to logging tool 120.

In some implementations, cable 134 can include more than one electrical conductor. For instance, cable 134 can be a seven-conductor logging cable. Example cables 134 include a 15/32" diameter cable. Electrical characteristics of these example cables are shown below:

| | |
|---|---|
| Electrical Insulation resistance | 25,000-50,000 megaohm/kft at 500 VDC |
| Rated insulation breakdown voltage | 1100-1200 VDC |
| Conductor series resistance | ~10 ohms/kft maximum |
| Capacitance (any conductor to armor) | 40 to 50 pf/ft. (depends on temperature rating and the insulating material) |
| Capacitive and series electrical resistance | 4% maximum variation balance |

Figure 2A:
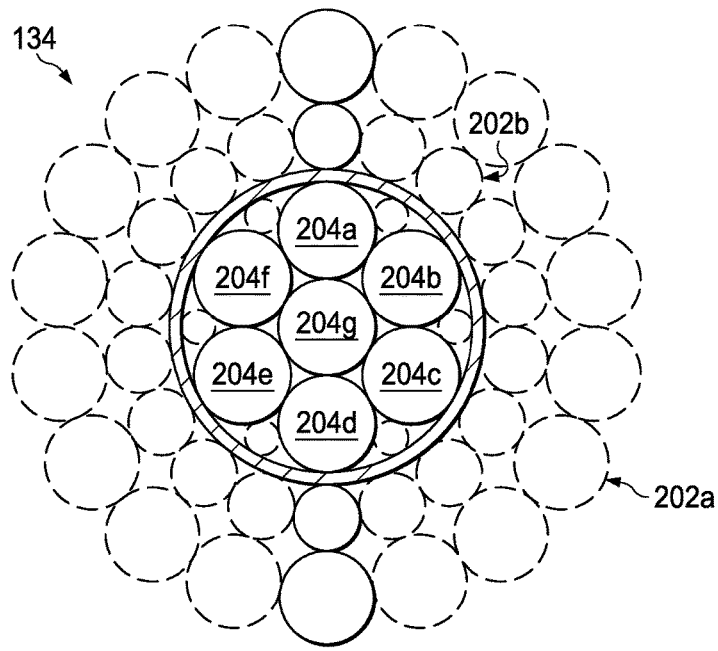
FIGS. 2A-B are diagrams of example cross-sections of a cable.
Figure 2B:
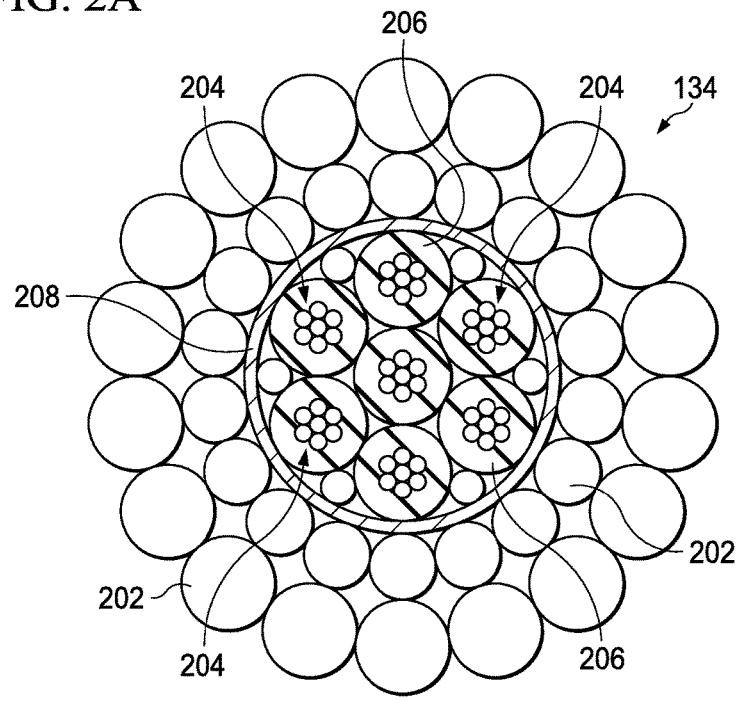

The geometry of an example cross-section of a seven-conductor cable 134 is shown in FIGS. 2A-B. In this example, cable 134 includes two layers of contra-helically wound steel armor 202 (e.g., armor layers 202a and 202b), encasing seven electrical conductors 204 (e.g., conductors 204a-g). The geometry of the electrical conductors is six outer conductors (e.g., 204a-f) wrapped around a seventh central conductor (e.g., 204g). The six outer conductors 204a-f are equally spaced circumferentially. As shown in FIG. 2B, each of the conductors 204 is surrounded by an insulating jacket 206. The insulated conductors 204 are bundled together in a semi-conductive wrap 208. The bundle is surrounded to by two layers of counter-wound metal armor wire, forming steel armor layers 202. The steel armor layers 202*a-b* are conductive (e.g., about 1 ohm/1000 ft), and in some implementations, can be used as an eighth electrical conductor. The steel armor layers 202*a-b* are also ferromagnetic, and in some implementation, may be magnetically "marked" at regular intervals as a way of monitoring the downhole position of the tool 120.

Although example cables and their corresponding characteristics are described above, these provided merely as examples. Other cables, having different characteristics can be used, depending on the implementation. For instance, cables can have a different number of conductors, a different geometry, a different overall diameter, different individual diameters for each conductor or armor, and/or different overall electrical characteristics, depending on the implementation. In some implementations, other suitable examples of cable 134 might include cables with stainless steel armor, MP35 armor, or other armors that have higher armor resistances. These cables might be more desirable under certain circumstances, for example for corrosive drilling environments (e.g., environments with high $H_2S$ and/or $CO_2$ concentrations).

The cable 134 can vary in length, depending on the implementation. For example, in some cases, cable 134 can be approximately five or more miles in length. Due to this length, the electrical conductors of cable 134 may be subject to strong capacitive and inductive coupling. As a consequence of this coupling, signals sent downhole along any two arbitrary conductors may be subject to distortion, and can produce significant "crosstalk" on the other conductors.

The effects of crosstalk can be reduced in a variety of ways. In some implementations, data can be transmitted over the cable using electrical "eigenmodes." By transmitting signals over groupings of conductors having certain symmetries, much of the coupling between conductors can cancelled out by the symmetry of the conductor grouping. As an example, in some implementations, signals can be transmitted over four conductors of a seven-conductor cable using an appropriately selected transmission mode (e.g., an "eigenmode"), in which signals transmitted over each of the four conductors are orthogonal to each other. This approach, however, may be limited by the number of available conductors. For instance, if a particular transmission mode requires the use of four conductors to ensure orthogonally, only a single channel of data can be transmitted using a seven-conductor cable in order to maintain signal orthogonally.

In some implementations, when limited by the number of available conductors in a cable, multi-channel data transmission can be achieved by using multiple cables and transmitting separate channels of data simultaneously along each of these cables. Although transmitting separate channels of data along separate cables can increase data throughput, this solution may be impractical in some cases. For example, running multiple independent cables can increase the material costs needed to implement the telemetry system, and can increase the labor and complexity needed to operate and maintain the system. Similarly, replacing an existing cable with another cable having a greater number of conductors might also be impractical in some cases, as it can likewise increase expense and labor.

To allow multiple channels of data to be transmitted along a single multi-conductor cable, data can be divided into two or more different channels, and each channel of data can be transmitted along a pair of conductors. As only two conductors are required for each channel of data, multiple channels of data can be transmitted over many of the existing types of multi-conductor cables currently used in well logging applications. As an example, for a seven-conductor cable, two channels of data can be transmitted on a total of four conductors, or three channels of data can be transmitted on a total of six conductors. As data transmitted in each of these channels are independent from one other, the overall throughput of the telemetry system is increased.

Figure 3:
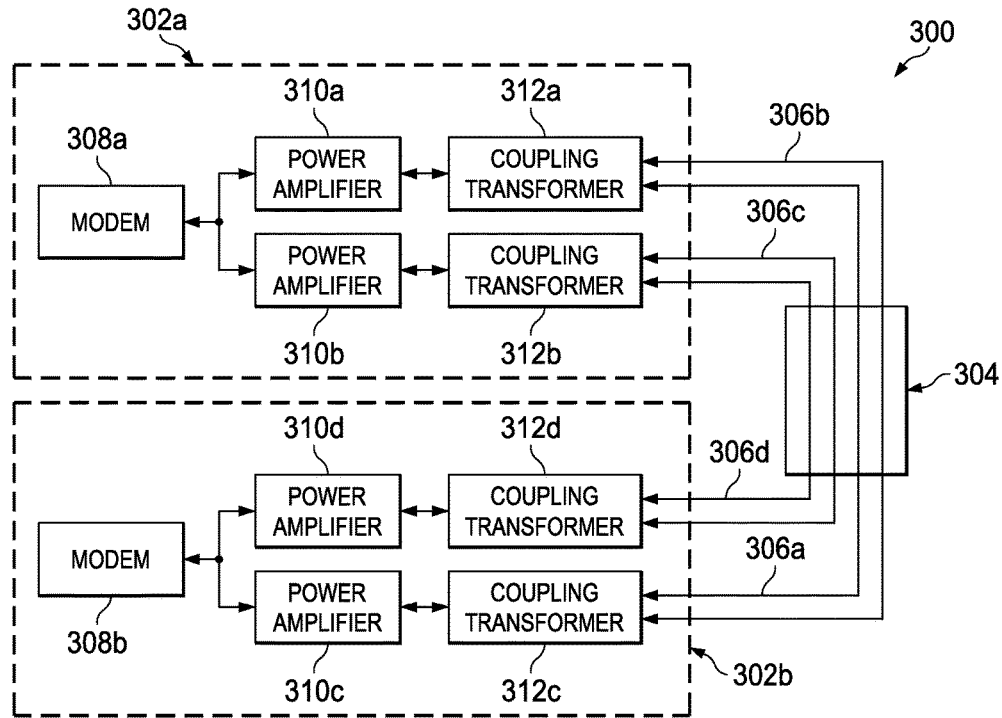
FIG. 3 is a diagram of an example telemetry system.

A diagram of a simplified example multi-channel telemetry system 300 is shown in FIG. 3. Telemetry system 300 includes two transceivers 302*a-b* connected by a cable 304. Cable 304 can be similar to cable 134, as described above. For example, cable 304 can include several conductors, four of which are shown in FIG. 3 as conductors 306*a-d*.

Transceivers 302*a-b* are coupled to opposite ends of conductors 306*a-d*, and are used to transmit electrical signals along cable 304 and/or receive electrical signals from cable 304. Thus, transceiver 302*a-b* can act as both transmitter modules and receiver modules, depending on which direction data is being transmitted. Transceivers 302*a-b* can be positioned in a variety of locations. As an example, transceiver 302*a* can be located on the earth's surface (e.g., as a part of a computing subsystem on the surface), transceiver 302*b* can be located within a wellbore (e.g., as a part of a subterranean logging tool 102), and data can be transmitted between the two transceivers via the cable 304. Each transceiver 302*a-b* includes a modem 308*a-b*, and a power amplifier and a coupling transformer coupled to each pair of conductors. For example, transceiver 302*a* includes a power amplifier 310*a* and coupling transformer 312*a* coupled to conductors 306*a* and 306*b*, and a power amplifier 310*b* and coupling transformer 312*b* coupled to conductors 306*c* and 306*b*. In a similar manner, transceiver 302*b* includes a power amplifier 310*c* and coupling transformer 312*c* coupled to conductors 306*a* and 306*b*, and a power amplifier 310*d* and coupling transformer 312*d* coupled to conductors 306*c* and 306*b*.

In an example implementation, data can be transmitted from transceiver 302*a* (acting as a transmitter module) to transceiver 302*b* (acting as a receiver module) along a pair of conductors 306*a-b*. The modem 308*a* receives data (e.g., telemetry or logging data from a logging tool 102), generates an analog carrier signal (e.g., an analog electrical waveform), and encodes the data by modulating the analog carrier signal (e.g., using quadrature amplitude modulation (QAM) or other suitable modulation method). In some implementations, modem 308*a* can include different modules to perform each of these tasks. As an example, modem 308*a* can receive data using a receiver module (e.g., a component that listens for electrical signals from logging tool 102 and decodes the received signals into data readily understood by the modem 308*a*). As another example, modem 308*a* can generate an analog carrier signal using a signal generator module (e.g., a component to generate repeating or non-repeating electrical waveforms). As another example, modem 308*a* can encode the digital data using an encoder module (e.g., a component for processing electrical signals in order to encode data into modulated electrical signals). Further, although modem 308*a* is described as having several different modules to illustrate its functionality, in some cases, some modules can be combined into a single component (e.g., implemented on a single processor or other component), or implemented across several different components (e.g., implemented across more than one processor or other components). In some implementations, modem 308*a* can be an asymmetric digital subscriber line (ADSL) modem, and may transmit data according to a particular transmission protocol.

The modulated carrier signal is amplified by a power amplifier 310a, and applied to conductors 306a-b by coupling transformer 312. The modulated carrier signal is carried by conductors 306a-b to transceiver 302b. At transceiver 302b, the modulated carrier signal is received by coupling transformer 312c, amplified by a power amplifier 310c, and demodulated by modem 308b into the original digital data. As with modem 308b, in some implementations, modem 308b can include different modules to perform each of these tasks. As an example, modem 308b can detect electrical signals that were applied to the conductors using a signal detector module (e.g., a component that detects electrical signals induced by coupling transformer 302b, corresponding to electrical signals that were carried through the conductors of the cable). As another example, modem 308a can decode the digital data using a decoder module (e.g., a component for processing electrical signals in order to demodulate electrical signals into the original data). Further, although modem 308b is described as having several different modules to illustrate its functionality, in some cases, some modules can be combined into a single component (e.g., implemented on a single processor or other component), or implemented across several different components (e.g., implemented across more than one processor or other components). In some implementations, modem 308b can be an asymmetric digital subscriber line (ADSL) modem, and may transmit data according to a particular transmission protocol.

Thus, in this example, data is transmitted in a single data channel along conductors 306a-b. In a similar manner, data can also be transmitted independently in a second data channel along conductors 306c-d, for example by using power amplifiers 310b and 310d, and coupling transformers 312b and 312d. Accordingly, the data throughput of the two-channel telemetry system 300 is potentially increased compared to an otherwise equal single-channel implementation.

Although in the above example transceiver 302a is used to transmit data and transceiver 302b is used to receive data, in some implementations, each transceiver 302a-b can be used to transmit data, receive data, or both. Accordingly, in some implementations, transceivers 302a-b can each include similar components and/or have similar capabilities.

Figure 4:
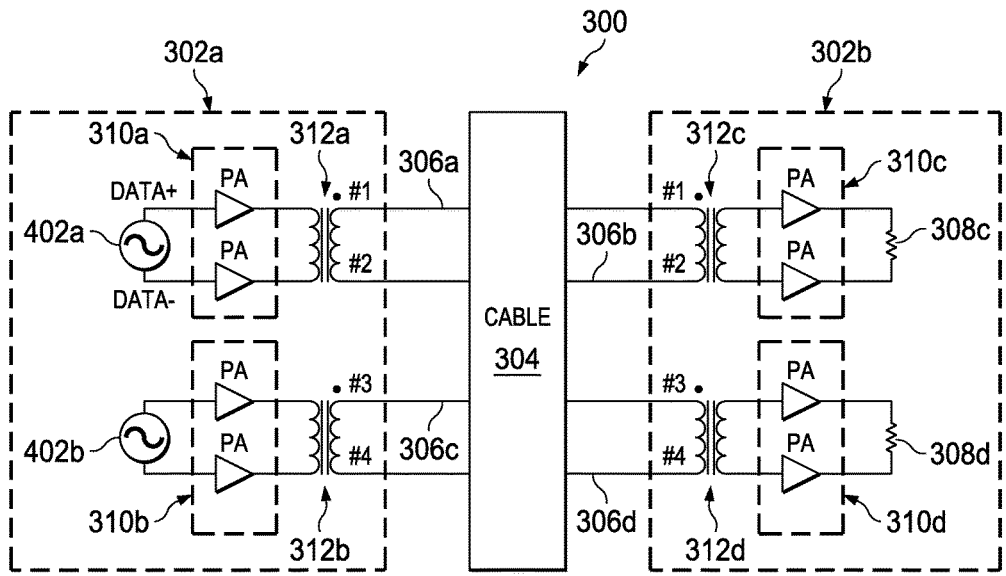
FIG. 4 is a schematic of the transmission of a modulated carrier signal from a modem along the conductors of a cable 304.

FIG. 4 illustrates how a modulated carrier signal 402a from modem 308a can be transmitted along conductors 306a-b of cable 304. As shown in FIG. 4, a modulated carrier signal 402a can be represented as having a positively polarized waveform (i.e., "data+") and a negatively polarized waveform (i.e., "data−"). Each waveform is amplified by power amplifier 310a (e.g., by a line amplifier for each waveform), and through coupling transformer 312a, induces a pair of oppositely polarized waveforms on conductors 306a-b, respectively. These waveforms travel the length of conductors 306a-b, and through coupling transformer 312c, induce another pair of oppositely polarized waveforms. These induced waveforms are amplified by power amplifier 310c (e.g., by a line amplifier for each waveform), and are detected by the modem 308b (represented by a resistor). Thus, in this example, data is transmitted in a single data channel along conductors 306a-b as a pair of oppositely polarized waveforms. In a similar manner, data can also be transmitted in a second data channel along conductors 306c-d, for example by using power amplifiers 310b and 310d, and coupling transformers 312b and 312d.

Although a telemetry system 300 is shown above, this is merely one example implementation. The components and/or arrangement of a telemetry system can differ, depending on each implementation. For example, in some cases, the telemetry system can have a different number of conductors and/or a different number of independent data channels. Correspondingly, the telemetry system can have a different number of power amplifiers and coupling transformers. Further, although a telemetry system might include a cable with several conductors, not all conductors need be used to carry data in the manner described above. As an example, if a telemetry system includes a cable with seven conductors, in some implementations, only a subset of these conductors might be used to carry data in this manner (e.g., four or six). Further still, although individual components are shown above to illustrate the functionality of telemetry system 300, in some cases, some components can be combined into a single device, or implemented across several different devices.

Figure 5:
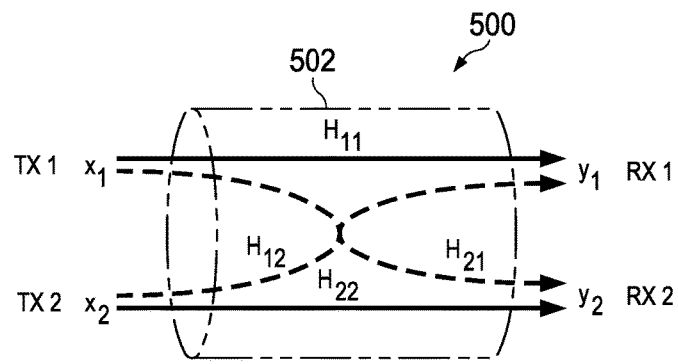
FIG. 5 shows a system for representing modeling crosstalk on two channels.

In some cases, as the conductors of a cable may be positioned in close proximity along the length of the cable, electrical waveforms corresponding to each of the different data channels may be subject to distortion, and in some circumstances, can produce significant crosstalk on the other channels. This crosstalk can be expressed mathematically. For example, as shown in FIG. 5, a system 500 can have a first data channel between a transmitter TX1 and a receiver RX1 and a second data channel between a transmitter TX2 and a receiver RX2. Signals $X_1$ and $X_2$, applied by the transmitters TX1 and TX2, respectively, to the conductors of cable 502, are subject to crosstalk interference, and are output from cable 502 as $Y_1$ and $Y_2$, respectively. The relationship between $X_1$, $X_2$, $Y_1$, and $Y_2$ can be expressed in the frequency domain as:

$$\begin{bmatrix} Y_1 \\ Y_2 \end{bmatrix} = \begin{bmatrix} H_{11} & H_{12} \\ H_{21} & H_{22} \end{bmatrix} \begin{bmatrix} X_1 \\ X_2 \end{bmatrix} + \begin{bmatrix} N_1 \\ N_2 \end{bmatrix},$$

where the diagonal terms $H_{11}$ and $H_{22}$ are the channel coefficients for the first and second channels, respectively, the off-diagonal terms $H_{12}$ and $H_{21}$ are the crosstalk channel coefficients, and $N_1$ and $N_2$ are the noise for the first and second channels, respectively. Thus, $H_{12}X_2$ and $H_{21}X_1$ are the crosstalk interferences at the receiver RX1 and the receiver RX2, respectively.

This crosstalk interference can be canceled using QR decomposition. In QR decomposition (also called a QR factorization), a matrix A is decomposed into a product A=QR of an orthogonal matrix Q and an upper triangular matrix R. Applying QR decomposition to the example shown in FIG. 5:

$$H=QR=[q_{11}/q_{21}\ q_{12}/q_{22}]\ [r_{11}/0\ r_{12}/r_{22}],$$

and $$Q^*Y=Q^*QRX+Q^*N=RX+\tilde{N}.$$

Thus, $$\begin{bmatrix} \tilde{Y}_1 \\ \tilde{Y}_2 \end{bmatrix} = \begin{bmatrix} r_{11} & r_{12} \\ 0 & r_{22} \end{bmatrix} \begin{bmatrix} X_1 \\ X_2 \end{bmatrix} + \begin{bmatrix} \tilde{N}_1 \\ \tilde{N}_2 \end{bmatrix}.$$

Therefore, estimates $\hat{X}_1$ and $\hat{X}_2$ for input signals $X_1$ and $X_2$, respectively, can be determined by the following relationships:

$$\hat{X}_2 = demod\left[\frac{\tilde{Y}_2}{r_{22}}\right],$$

and $$\hat{X}_1 = demod\left[\frac{\tilde{Y}_1 - r_{12} \cdot \hat{X}_2}{r_{11}}\right].$$

In order to accurately estimate $X_1$ and $X_2$ (e.g., to determine a $\hat{X}_1$ and $\hat{X}_2$ suitably close to $X_1$ and $X_2$), appropriate values for the channel coefficient matrix H (and by extension, matrices Q and R) must be used. As appropriate values for H can differ depending on the particular application, a model can be developed and subsequently used to estimate H for each particular application.

Figure 6A:
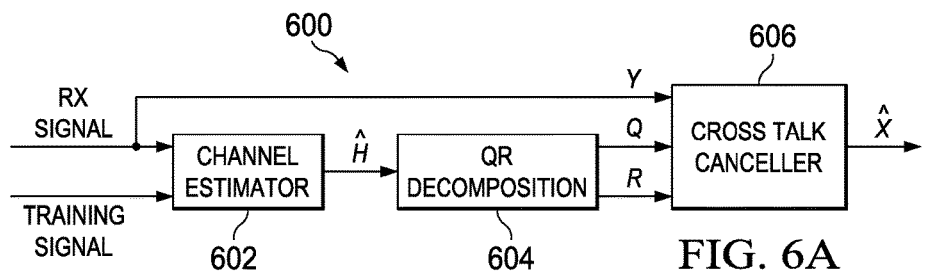
FIG. 6A is a diagram of a system for canceling crosstalk.

One example system 600 for canceling crosstalk is shown in FIG. 6A. System 600 includes a channel estimator module 602, a QR decomposition module 604, and a crosstalk canceller module 606. Based on a received signal Y (e.g., the signal received on a receiving end of a cable), system 600 determines $\hat{X}$, an estimate of the input signal X (e.g., the original signal that was input into a transmitting end of the cable). System 600 can be implemented as a part of telemetry system 300, or independently from telemetry system 300. For example, in some implementations, system 600 can be implemented as a part of modem 308*a-b* or transceivers 302*a-b*. In some implementations, system 600 can be implemented independently from system 300, for example as a part of an independent processing module that receives and processes data obtained by telemetry system 300.

Channel estimator module 202 estimates the channel coefficient matrix H for the cable, and produces an estimate $\hat{H}$. In some implementations, this estimate can be made by using a training signal S to filter received signal Y in order to produce an estimate $\hat{H}$. As an example, based on training signal S and a received signal Y, the channel estimator module 202 can determine an estimate $\hat{H}$ through the following relationship:

$$\hat{H} = YS^*(SS^*)^{-1}.$$

Other relationships may be possible, depending on the implementation. Training signal S can be determined empirically or numerically. For example, in some implementations, training signal S can be determined using a model that selects a particular training signal S based on one or more conditions. A model can be developed, for example, by inputting several known signals (e.g., $X_1, X_2, X_3, \ldots, X_N$) into system 600 under a variety of conditions (e.g., different environmental conditions, different cable properties, different transmission parameters, and so forth). Here, each known signal corresponds to a known discrete portion of data (e.g., a "training symbol"). The outputs from the system 600 (e.g., $\hat{X}_1, \hat{X}_2, \hat{X}_3, \ldots, \hat{X}_N$) are then correlated with their corresponding inputs in a training database. This training database is used to construct a model (e.g., a mapping function) such that, given particular input signals and conditions for a given application, one can determine a training signal S suitable for that application. As an example, for particular conditions, a suitable S might minimize or otherwise result in an acceptable difference between the input signals and output signals.

The estimate $\hat{H}$ is passed to the QR decomposition module 604. QR decomposition module 604 decomposes $\hat{H}$ into matrices Q and R, and passes these matrices to the crosstalk canceller module 606. QR decomposition module 604 can perform QR decomposition using one or more different techniques. For example, in some implementations, QR decomposition module 604 can compute a QR decomposition using the Gram-Schmidt process, Householder transformations, or Givens rotations.

Figure 6B:
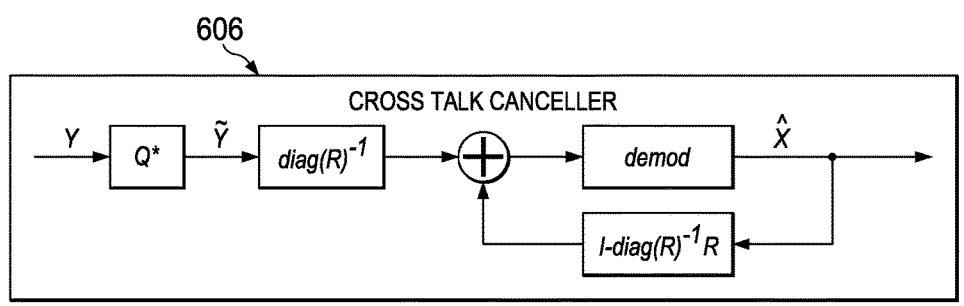
FIG. 6B is a diagram of an example crosstalk canceller module.

The crosstalk canceller module 606 determines an estimate $\hat{X}$ based on Y, Q, and R. An example implementation of crosstalk canceller module 606 is shown in FIG. 6B, in which the received signal Y is multiplied by Q to result in $\tilde{Y}$. $\tilde{Y}$ is in turn multiplied by diag $(R)^{-1}$, and the product is demodulated to result in $\hat{X}$. Positive feedback can be provided by multiplying $\hat{X}$ by $(1-\text{diag }(R)^{-1}R)$, and adding it to the result of $\tilde{Y}(\text{diag }(R)^{-1})$. In some implementations, crosstalk canceller module 606 can perform demodulation by using, in part, a sphere demodulator or other "fuzzy" demodulator in order to demodulate the processed signal into discrete decoded symbols (e.g., by mapping each processed signal into discrete symbols on a QAM constellation). From these symbols, the original transmitted message can be ascertained. While example implementations of a crosstalk canceller module 606 are described, other implementations are possible, depending on the application.

Although individual modules are shown above to illustrate the functionality of system 600, in some cases, one than one module can be implemented on a single device, or a single module can be implemented across several different devices.

Figure 7A:
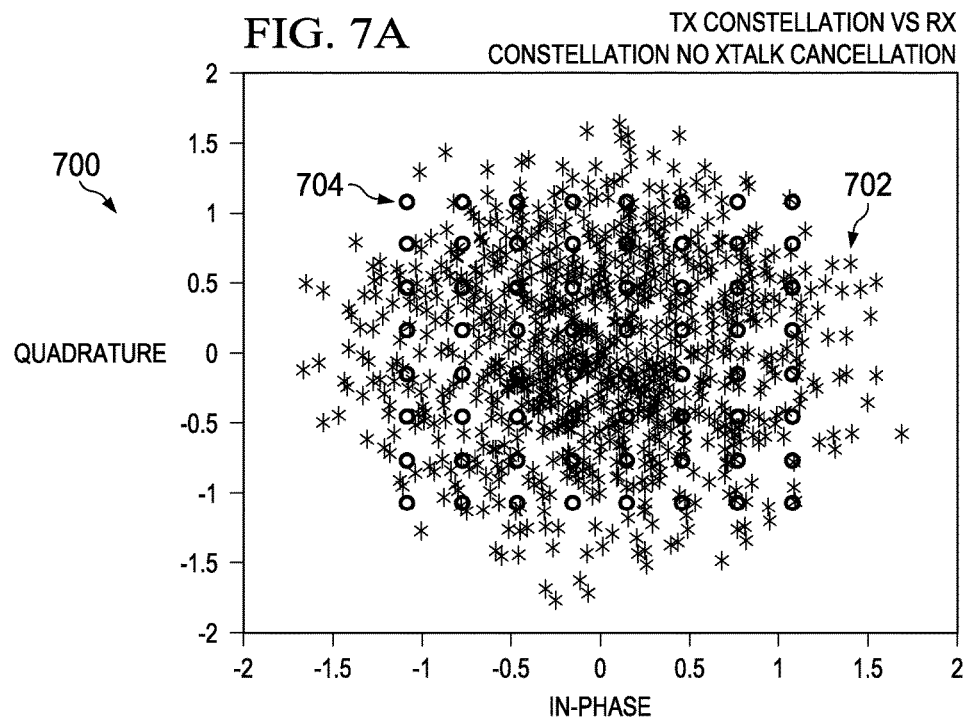
Figure 7B:
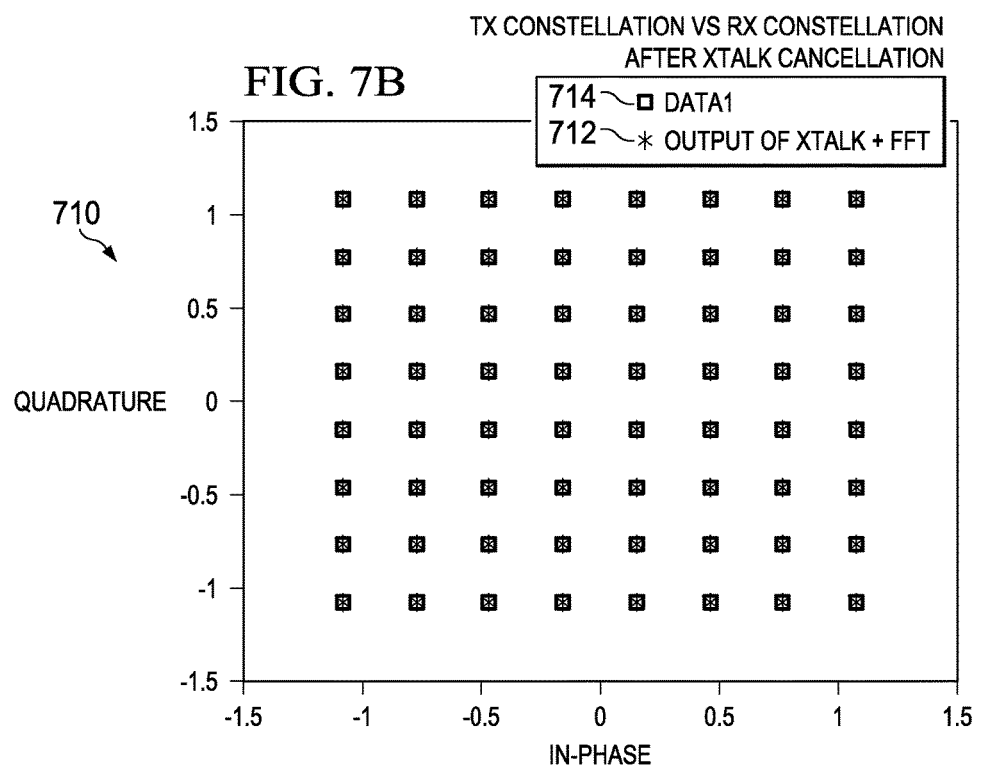

FIGS. 7A-F show examples of how implementations of system 600 can be used to cancel or reduce crosstalk across channels, and to improve the transmission of signals across each of the channels. Referring to FIG. 7A, plot 700 shows symbols that were decoded from one data channel without applying any of the crosstalk reduction techniques described above. In this example, the signals input into each of the channels did not contain any noise. As shown in plot 700, decoded symbols 702 generally do not align with the constellation 704, making it difficult to accurately ascertain the originally transmitted message. As shown in plot 710 of FIG. 7B, when symbols were decoded using an implementation of the above described crosstalk reduction technique, the decoded symbols 712 generally aligned significantly better with the constellation 714, making it substantially easier to ascertain the originally transmitted message.

In another example, referring to FIG. 7C, plot 720 shows symbols that were decoded from one data channel without applying any of the crosstalk reduction techniques described above. In this example, the signals input into each of the channels contained noise. As shown in plot 720, decoded symbols 722 generally do not align with the constellation 724, making it difficult to accurately ascertain the originally transmitted message. As shown in plot 740 of FIG. 7D, when symbols were decoded using an implementation of the above described crosstalk reduction technique, the decoded symbols 742 generally aligned significantly better with the constellation 744, making it substantially easier to ascertain the originally transmitted message.

Similarly, referring to FIG. 7E, plot 750 shows symbols that were decoded from the other data channel without applying any of the crosstalk reduction techniques described above. In this example, the signals input into each of the channels contained noise. As shown in plot 750, decoded symbols 752 generally do not align with the constellation 754, making it difficult to accurately ascertain the originally transmitted message. As shown in plot 760 of FIG. 7F, when symbols were decoded using an implementation of the above described crosstalk reduction technique, the decoded symbols 762 generally aligned significantly better with the constellation 764, making it substantially easier to ascertain the originally transmitted message.

Thus, implementations of the above can be used to reduce or eliminate crosstalk, thereby improving the accuracy and speed of data transmission across a cable.

In some implementations, QR decomposition module 604 can perform a sorted QR decomposition. This can be beneficial in certain circumstances, for example, when each of the channels have different signals with different signal to noise ratios (SNR). In an example implementation, the BER performance can be improved by detecting a signal with higher SNR first, and then subtracting out the interference caused by the detected signal to detect the next signal sequentially. In this manner, the QR decomposition technique can be a "sorted" QR decomposition. This can be implemented, for example, by exchanging the columns of H to find the R that maximizes $r_{kk}$ for k=2 to 1. This is equivalent to finding the detection order according to the SNR, because $r_{kk}$ is related to the SNR as:

$$SNR_k = \frac{|X_k|^2 |r_{kk}|}{|\tilde{n}_k|^2} \sim |r_{kk}|.$$

Figure 8:
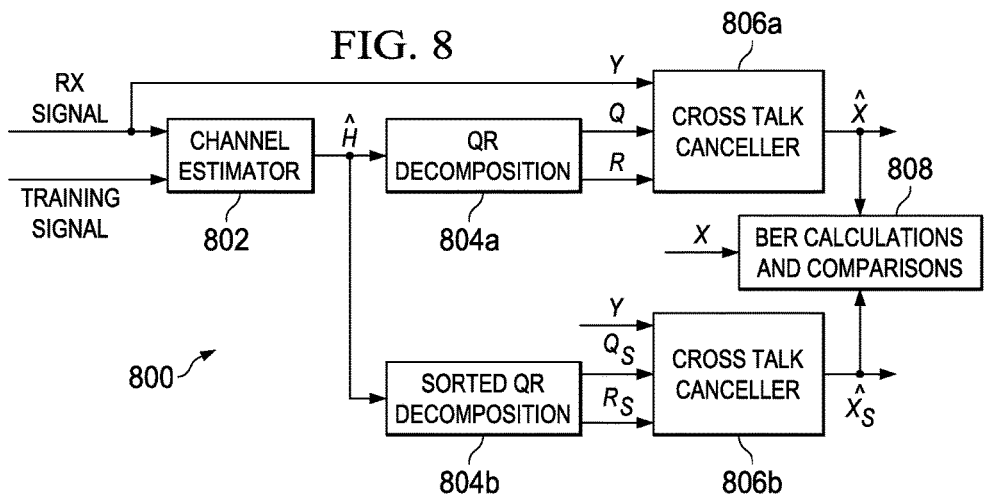
FIG. 8 is a diagram of an example system for comparing QR decomposition and sort QR decomposition.

The use of QR decomposition and sorted QR decomposition can be compared using a system 800, an example of which is shown in FIG. 8. System 800 is similar to system 600. For example, system 800 includes a channel estimator module 802, two QR decomposition modules 804a-b, and two cross talk canceller modules 806a-b. The two QR decomposition modules 804a-b are similar to that of system 600. However, one QR decomposition module 804a is used to compute a QR decomposition, and the other QR decomposition module 804b is used to compute a sorted QR decomposition. Each of the other modules corresponds to those of system 600.

System 800 also includes an error calculation module 808. Error calculation module 808 determines the accuracy of system 600 using QR decomposition compared to an otherwise equal system 600 using sorted QR decomposition. For example, system 800 compares the estimate $\hat{X}$ to a known X (e.g., a known signal that was inputted into the data channel), in order to determine the accuracy of estimates $\hat{X}$ made by modules 802, 804a, and 806a when used in conjunction (and correspondingly, the accuracy of estimates made using QR decomposition). In some implementations, error calculation module 808 can calculate the bit error rate (BER) of a particular estimate $\hat{X}$ based on a known X In some implementations, system 800 can also determine the effectiveness of crosstalk canceller module 806b (and correspondingly, the accuracy of estimates made using sorted QR decomposition). For example, system 800 can compute a sorted QR decomposition (e.g., by using sorted QR decomposition module 804b) in order to obtain matrices $Q_s$ and $R_s$. $Q_s$ and $R_s$ are then used to estimate signal X based on the received signal Y (e.g., by using cross talk canceller module 806b similar or identical to crosstalk canceller module 806a). The estimated signal $\hat{X}_s$ is then compared to the known X, in order to determine the accuracy of predictions made by using sorted QR decomposition. Thus, assuming crosstalker canceller modules 806a-b are equal, the performance of a QR decomposition module 1104a and a sorted QR decomposition module 804b can be compared. In some implementations, error calculation module 808 can calculate the bit error rate (BER) of a particular estimate $\hat{X}_s$ based on a known X.

While an example system is shown above, this is merely an example. Other arrangements can also be used to measure the performance of various implementations of system 600. Further, although individual modules are shown above to illustrate the functionality of system 800, in some cases, one than one module can be implemented on a single device, or a single module can be implemented across several different devices.

Figure 9:
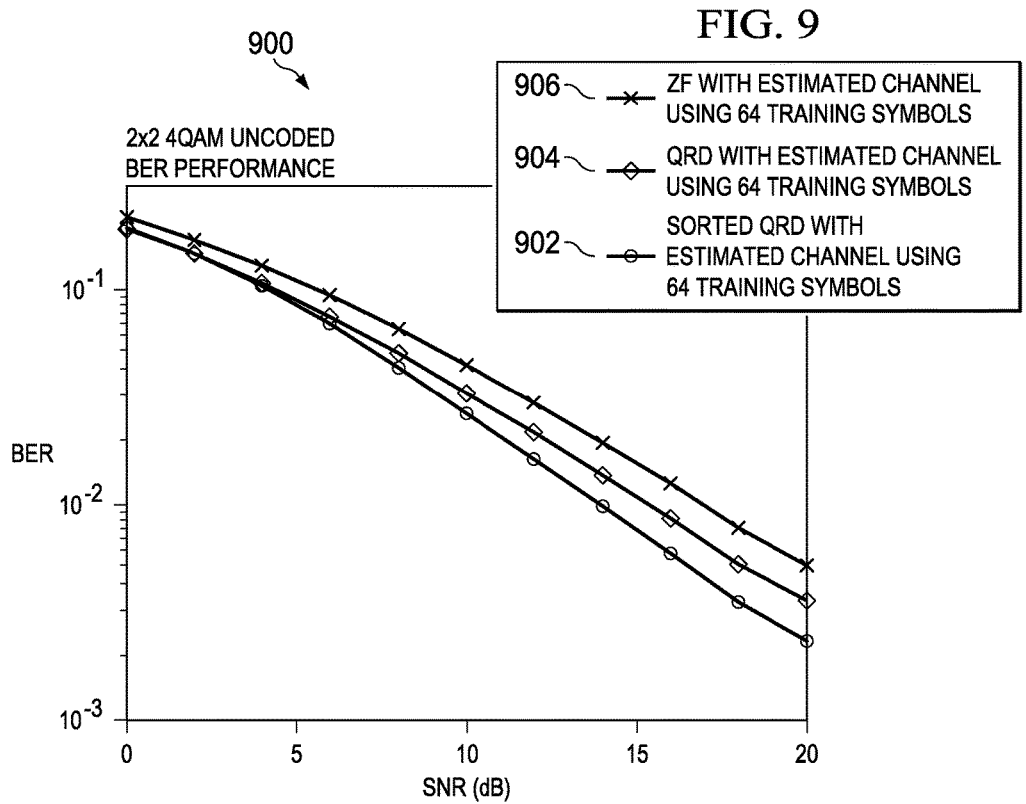
FIG. 9 is a plot comparing of the performance of example telemetry systems under various conditions.

Referring to FIG. 9, plot 900 shows comparisons of the performance of example implementations of system 600 under various conditions. As shown in plot 900, of the conditions shown, system 600 is most effective at estimating X when using a sorted QR decomposition technique (line 902), compared to a sorted QR decomposition technique (line 904), and a zero force equalization technique (ZF) (line 906). As shown, line 902 corresponds to the lowest BER of the given examples. In other examples, the performance of each implementation of system 600 can differ, as can their performance relative to other implementations, depending on the application.

Figure 10A:
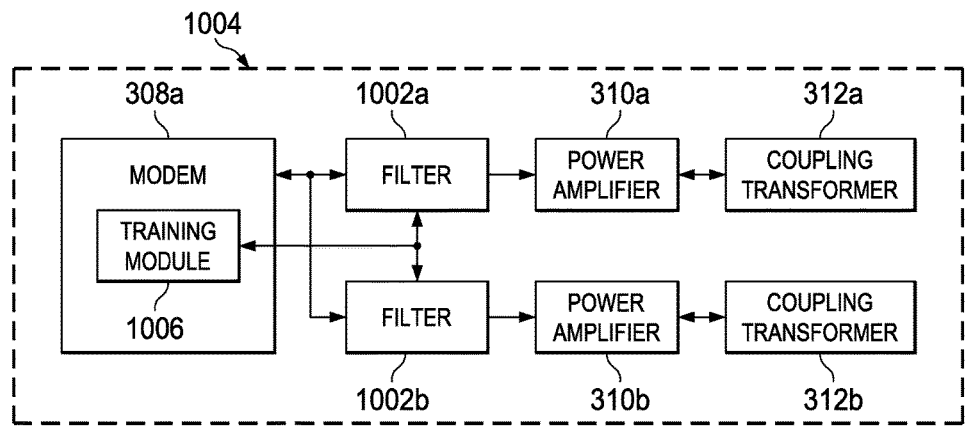
FIG. 10A is a diagram of an example transceiver having a filter.

In some implementations, higher frequency signals may experience greater signal loss as it is carried about the conductors of cable 134, compared to lower frequency signals carried along the same cable 134. This signal loss can potentially lead to lower data transmission throughput through cable 134. In some implementations, the signal loss can be addressed through a filter that differentially amplifies signals having certain frequency components (e.g., higher frequency components) compared to signals having other frequency components (e.g., lower frequency components). This filter can be included as a part of one of more of the transceivers or as a component separate from the transceiver. An example implementation is shown in FIG. 10A, in which two filters 1000a-b are included as a part of transceiver 1004, and a training module 1006 is included as a part of modem 308a. The components of transceiver 1004 can be otherwise similar to the transceivers described above, for example transceiver 302a.

Figure 10B:
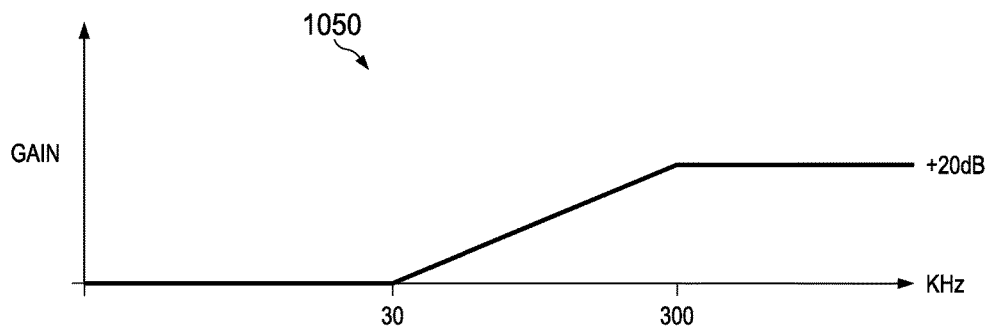
FIG. 10B is a plot of an example response function.

Filters 1002a-b apply a filter to the signals generated by modem 308a, and can be used to differentially amplify signals having certain pre-determined frequency components. For example, in some implementations, filters 1002a-b can filter signals produced by modem 308a according to a response function. An example response function 1050 is shown in FIG. 10B, in which signal components having a frequency of 300 KHz or higher are amplified by 20 dB, signals between 30 and 300 kHz are amplified according to a ramp function from 0 to 20 dB, and signals below 30 kHz are not amplified. While an example response function 1050 is shown in FIG. 10B, this is merely an example. The response function can different, depending on the application. For example, in some implementations, the response function can include one or more different ramp functions (e.g., ramp functions that begin or end at different frequencies, or increase at different rates), can plateau at different frequencies, or might not plateau at all. In some implementations, the response function can be arbitrary, and need not be defined by ramp function at all.

Further, as the most appropriate (or otherwise acceptable) response function can differ for each application, in some implementations, an appropriate response function can be selected prior to use. As an example, the modem 308a can include a training module 1006 that changes the response function of filters 1002a-b based prior to use. Training module 1006 can change the response functions based on training data. As an example, training module 1006 can be trained using several test cases in which the system transceiver was run, and its performance assessed, under a variety of conditions. Based on these test cases, the training module 1006 can selected an appropriate response function for each particular application.

While an example system is shown above, this is merely an example. Other arrangements can also be used to filter a signal prior to its application to a conductor. Further, although individual modules are shown above to illustrate the functionality of transceiver 1004, in some cases, one than one module can be implemented on a single device, or a single module can be implemented across several different devices.

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, computing subsystems (e.g., computing subsystem 110), transceivers (e.g., 302a-b and 1004), crosstalk cancellation systems (e.g., system 600), simulation systems (e.g., system 800) can be partially or wholly implemented in digital electronic circuitry, or in computer software, firmware, or hardware. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 11:
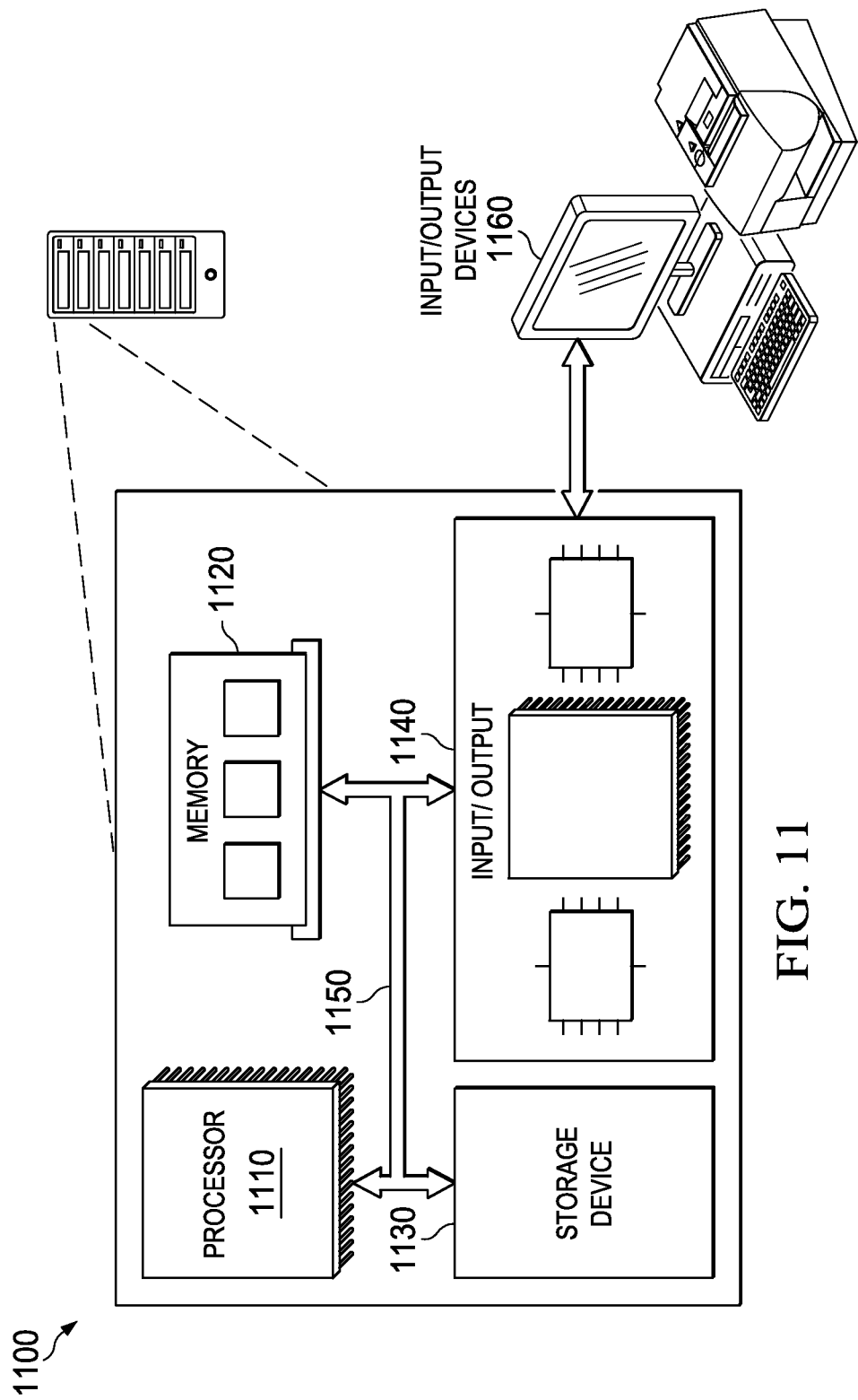
FIG. 11 is a diagram of an example computer system.

FIG. 11 shows an example computer system 1100. The computer system 1100, for example, can be used to implement, or otherwise control, all or part of a computer subsystem (e.g., the computing subsystem 110), a transceiver (e.g., the transceivers 302a-b and 1004), crosstalk cancellation systems (e.g., the system 600), simulation systems (e.g., the system 800), or combinations thereof. In some implementations, several computer systems 1100 can be used in combination to implement and/or control one or more of these components. As an example, referring to FIG. 3., a first computer system 1100 positioned on one end of a cable (e.g., the cable 304) can be used to implement and/or control a first transceiver (e.g., the transceiver 302a), and a second computer system 1100 positioned on the opposite end of the cable can be used to implement and/or control a second transceiver (e.g., the transceiver 302b). As another example, referring to FIGS. 6 and 8, one or more computer systems 1100 can be communicatively coupled to a transceiver in order to perform cross-talk cancellation. In some implementations, a computer system 1100 need not be positioned in direct proximity with a component in order to control that component's operation. As an example, in some implementations, a computer system 1100 can be positioned remote from a transceiver and coupled through an approximate communications medium in order to exchange data and instructions with the transceiver.

The system 1100 includes a processor 1110, a memory 1120, a storage device 1230, and an input/output device 1140. Each of the components 1110, 1120, 1130, and 1140 can be interconnected, for example, using a system bus 1150. The processor 1110 is capable of processing instructions for execution within the system 1100. In some implementations, the processor 1110 is a single-threaded processor, a multi-threaded processor, or another type of processor. The processor 1110 is capable of processing instructions stored in the memory 1120 or on the storage device 1130. The memory 1120 and the storage device 1130 can store information within the system 1100.

The input/output device 1140 provides input/output operations for the system 1100. In some implementations, the input/output device 1140 can include one or more network interface devices, e.g., an Ethernet card; a serial communication device, e.g., an RS-232 port; and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 1160. In some implementations, mobile computing devices, mobile communication devices, and other devices can be used. In some implementations, the input/output device 1140 can be used to communicate with one or more other computer systems. For example, a computer system 1100 can be coupled to a transceiver (e.g., a transceiver 302a-b) in order to control the operation of the transceiver and/or perform cross-talk cancellation.

Although an example computer system 1100 is described above, this is merely an example. In some implementations, a computer system 1100 can include additional components or fewer components than described above.

Implementations of the above may provide one or more benefits. In some implementations, compared to transferring a single channel of data through a cable, transferring independent data along each of multiple data channels and cancelling crosstalk interference between the channels can increase transmission throughput through the cable. As an example, in some implementations, transferring two channels of data on a seven conductor cable (where each channel is transferred on two conductors) allows for uplink throughput of greater than approximately 2000 Kbps in cables of up to 25 Kft, uplink throughput of greater than approximately 540 Kbps in cables of up to 40 Kft, and downlink throughput of greater than approximately 25 Kbps in cables of up to 40 Kft. In comparison, in some implementations, transferring one channel of data on a seven conductor cable (e.g., by using a single eigenmode across four conductors) allows for uplink throughput of approximately 800 Kbps in cables of up to 25 Kft, uplink throughput of less than approximately 300 Kbps, and downlink throughput of approximately 20 Kft. Although an example comparison is described above, this is only an example. Data throughput can differ, depending on each application.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. For example, while the above telemetry systems are discussed primarily in the context of a wireline system, it is recognized that implementations of these telemetry systems may also be used for other applications, such as measure while drilling (MWD) or logging while drilling (LWD). As an example, a drill string of a MWD or LWD system can include a cable 134, or a similar bundle of conductors, that extends along a length of the drill string. Data can be transmitted along this cable 134 or bundle of conductors in a manner similar to that described above.

Further, although the above telemetry systems are shown as transmitting data using two channels, in some implementations, more data channels can be used (e.g., three, four, five, six, or more data channels). Crosstalk between each of these channels can be cancelled or reduced in a manner similar to that described above.

Further still, although the above telemetry systems are shown as applying two oppositely polarized signals to each of two different conductors for each data channel, this need not be the case. For example, in some implementations, telemetry systems can apply other types of signals to the conductors (e.g., apply signals according to a particular eigenmode), and can apply the signals to more than two conductors for each channel. Further, each channel need not be transmitted on different sets of conductors. For example, in some implementations, one channel can be transmitted on a first set of conductors using a first transmission mode (e.g., using a first eigenmode), and a second channel can be transmitted on a second set of conductors using a second transmission mode (e.g., using a second eigenmode), where the first and second sets of conductors shares at least one of the same conductors. Crosstalk between each of these channels can be cancelled or reduced in a manner similar to that described above.

Various aspects of the invention are summarized as follows.

In general, in an aspect, a method of transmitting telemetry data includes receiving telemetry data from a downhole logging module, encoding the telemetry data as at least two channels of independent data, and applying electrical signals to conductors of a downhole cable based on the encoded telemetry data, where applying the electrical signals includes applying electrical signals corresponding to data for a first channel to a first plurality of conductors, and applying electrical signals corresponding to data of a second channel to a second plurality of conductors different than the first plurality of conductors. The method also includes detecting the electrical signals applied to the conductors, and decoding the telemetry data based on the measured electrical signals.

Implementations of this aspect may include one or more of the following features:

In some implementations, the first plurality of conductors can include two conductors. Applying electrical signals can include applying, to one conductor of the first plurality of conductors, an electrical signal having a first polarity corresponding to data of the first channel, and applying, to another conductor of the first plurality of conductors, an electrical signal having a second polarity corresponding to data of the first channel, the second polarity being opposite the first polarity.

In some implementations, the second plurality of conductors can include two conductors. Applying electrical signals can include applying, to one conductor of the second plurality of conductors, an electrical signal having a first polarity corresponding to data of the second channel, and applying, to another conductor of the second plurality of conductors, an electrical signal having a second polarity corresponding to data of the second channel, the second polarity being opposite the first polarity.

In some implementations, the method can further include canceling crosstalk interference between electrical signals of the first plurality of conductors and the electrical signals of the second plurality of conductors based on the measured electrical signals. Canceling crosstalk interference can include determining a model for crosstalk interference between the first plurality of conductors and the second plurality of conductors, determining a matrix comprising estimated channel information based on the model, applying a QR decomposition to the matrix to obtain decomposed matrices, and canceling crosstalk interference based on the decomposed matrices.

In some implementations, canceling crosstalk interference can include determining a model for crosstalk interference between the first plurality of conductors and the second plurality of conductors, determining a matrix comprising estimated channel information based on the model, applying a sorted QR decomposition to the matrix to obtain decomposed matrices, and canceling crosstalk interference based on the decomposed matrices.

In some implementations, the method can further include applying a non-uniform frequency-dependent gain to the electrical signals prior to applying the electrical signals to the conductors. Applying a non-uniform frequency-dependent gain can include applying a greater gain to higher frequency electrical signals and applying a lower gain to lower frequency electrical signals.

In some implementations, the cable can include seven conductors.

In some implementations, the telemetry data can correspond to properties of a subterranean region.

In some implementations, the telemetry data can correspond to properties of a downhole tool.

In general, in another aspect, a method of transmitting telemetry data includes receiving telemetry data from a downhole logging module, encoding the telemetry data as two at least two channels of independent data, and applying electrical signals to conductors of a downhole cable based on the encoded telemetry data, where applying the electrical signals comprises applying electrical signals corresponding to data for the a first channel to at least one of the conductors according to a first transmission mode, and applying electrical signals corresponding to data of the a second channel to at least one of the conductors according to a second transmission mode. The method also includes detecting the electrical signals applied to the conductors, canceling crosstalk interference between electrical signals corresponding to data for each of the channels based on the measured electrical signals, and decoding the telemetry data based on the measured electrical signals, where wherein the first transmission mode is orthogonal to the second transmission mode.

Implementations of this aspect may include one or more of the following features:

In some implementations, encoding the telemetry data can include encoding the telemetry data as two at least four channels of independent data. Applying the electrical signals can further include applying electrical signals corresponding to data for the a third channel to at least one of the conductors according to a third transmission mode, and applying electrical signals corresponding to data of the a fourth channel to at least one of the conductors according to a fourth transmission mode, where the third transmission mode is orthogonal to the fourth transmission mode.

In some implementations, canceling cancelling crosstalk interference can include determining a model for crosstalk interference between electrical signals of the first transmission mode and electrical signals of the second transmission mode, determining a matrix comprising estimated channel information based on the model, applying a QR decomposition to the matrix to obtain decomposed matrices, and canceling crosstalk interference based on the decomposed matrices.

In some implementations, canceling crosstalk interference can include determining a model for crosstalk interference between electrical signals of the first transmission mode and electrical signals of the second transmission mode, determining a matrix comprising estimated channel information based on the model, applying a sorted QR decomposition to the matrix to obtain decomposed matrices, and canceling crosstalk interference based on the decomposed matrices.

In general, in another aspect, a telemetry system includes a cable extending in a first direction, the cable including a plurality of conductors extending along the first direction. The telemetry system also includes a transmitter module including a receiver arranged to receive telemetry data, an encoder arranged to encode the telemetry data as at least two channels of independent data, and a signal generator coupled to input portions of the conductors, the signal generator arranged to apply electrical signals to the conductors based on the encoded telemetry data, where the signal generator is arranged to apply electrical signals corresponding to data of a first channel to a first plurality of conductors, and apply electrical signals corresponding to data of a second channel to a second plurality of conductors different than the first plurality of conductors. The system also includes a receiver module including a signal detector coupled to output portions of the conductors, the signal detector arranged to detect the electrical signals applied to the conductors, and a decoder arranged to decode the telemetry data based on the detected electrical signals, where the telemetry system is a downhole telemetry system.

Implementations of this aspect may include one or more of the following features:

In some implementations, the first plurality of conductors can include two conductors. The signal generator can be arranged to apply, to one conductor of the first plurality of conductors, an electrical signal having a first polarity corresponding to data of the first channel, and the signal generator can be arranged to apply, to another conductor of the first plurality of conductors, an electrical signal having a second polarity corresponding to data of the first channel, the second polarity being opposite the first polarity.

In some implementations, the second plurality of conductors can include two conductors. The signal generator can be arranged to apply, to one conductor of the second plurality of conductors, an electrical signal having a first polarity corresponding to data of the second channel, and the signal generator can be arranged to apply, to another conductor of the second plurality of conductors, an electrical signal having a second polarity corresponding to data of the second channel, the second polarity being opposite the first polarity.

In some implementations, the signal processor can be configured to cancel crosstalk interference between electrical signals of the first plurality of conductors and the electrical signals of the second plurality of conductors based on the measured electrical signals. Canceling crosstalk interference can include determining a model for crosstalk interference between the first plurality of conductors and the second plurality of conductors, determining a matrix comprising estimated channel information based on the model, applying a QR decomposition to the matrix to obtain decomposed matrices, and canceling crosstalk interference based on the decomposed matrices.

In some implementations, canceling crosstalk interference can include determining a model for crosstalk interference between the first plurality of conductors and the second plurality of conductors, determining a matrix comprising estimated channel information based on the model, applying a sorted QR decomposition to the matrix to obtain decomposed matrices, and canceling crosstalk interference based on the decomposed matrices.

In some implementations, the transmitter module can be configured to apply a non-uniform frequency-dependent gain to the electrical signals prior to applying the electrical signals to the conductors. The transmitter module can be configured to apply a greater gain to higher frequency electrical signals and apply a lower gain to lower frequency electrical signals.

In some implementations, the encoder can be arranged to encode the telemetry data as at least three channels of independent data, where the signal generator is arranged to apply electrical signals corresponding to data of a third channel to a third plurality of conductors different that the first and second plurality of conductors.

In some implementations, the cable can include seven conductors.

A number of examples have been described. Nevertheless, it will be understood that various modifications can be made. Accordingly, other implementations are within the scope of the following claims.

What is claimed is:

1. A method of transmitting telemetry data, comprising:
   receiving, by a first transceiver module, the telemetry data from a downhole logging module of a downhole tool;
   encoding, by the first transceiver module, the telemetry data received by the first transceiver module as at least two channels of independent data;
   applying electrical signals, by the first transceiver module, to conductors of a downhole cable based on the encoded telemetry data received from the downhole tool, wherein said applying the electrical signals comprises:
   said applying the electrical signals corresponding to the encoded telemetry data for a first channel of the at least two channels of independent data to a first plurality of the conductors, and
   said applying the electrical signals corresponding to the encoded telemetry data of a second channel of the at least two channels of independent data to a second plurality of the conductors different than the first plurality of the conductors;
   transmitting, by the first transceiver module, the electrical signals corresponding to the encoded telemetry data for the first channel and the electrical signals corresponding to the encoded telemetry data for the second channel over the downhole cable to a second transceiver module at an opposite end of the downhole cable;
   detecting, by the second transceiver module, the electrical signals transmitted by the first transceiver module;
   canceling, by the second transceiver module, crosstalk interference induced on the
   first and second plurality of the conductors of the downhole cable; and
   decoding, by the second transceiver module, the detected electrical signals with the crosstalk interference canceled.

2. The method of claim 1, wherein the first plurality of the conductors comprises two conductors.

3. The method of claim 2, wherein said applying the electrical signals by the first transceiver module comprises:
   applying, to one conductor of the first plurality of the conductors, an electrical signal having a first polarity corresponding to the encoded telemetry data of the first channel; and applying, to another conductor of the first plurality of the conductors, an electrical signal having a second polarity corresponding to the encoded telemetry data of the first channel, the second polarity being opposite the first polarity.

4. The method of claim 1, wherein the second plurality of the conductors comprises two conductors.

5. The method of claim 4, wherein said applying the electrical signals by the first transceiver module comprises:
   applying, to one conductor of the second plurality of the conductors, an electrical signal having a first polarity corresponding to the encoded telemetry data of the second channel; and
   applying, to another conductor of the second plurality of the conductors, an electrical signal having a second polarity corresponding to the encoded telemetry data of the second channel, the second polarity being opposite the first polarity.

6. The method of claim 1, wherein said canceling the crosstalk interference by the second transceiver module comprises:
   determining a model for crosstalk interference between the first plurality of the conductors and the second plurality of the conductors:
   determining a matrix comprising estimated channel information based on the model;
   applying a QR decomposition to the matrix to obtain decomposed matrices; and
   canceling crosstalk interference based on the decomposed matrices.

7. The method of claim 1, wherein said canceling the crosstalk interference by the second transceiver module comprises:
- determining a model for crosstalk interference between the first plurality of the conductors and the second plurality of the conductors;
- determining a matrix comprising estimated channel information based on the model;
- applying a sorted QR decomposition to the matrix to obtain decomposed matrices; and canceling crosstalk interference based on the decomposed matrices.

8. The method of claim 1, further comprising applying, by the first transceiver module, a non-uniform frequency-dependent gain to the electrical signals prior to the transmitting of the electrical signals by the first transceiver module over the downhole cable to the second transceiver module.

9. The method of claim 8, wherein said applying the non-uniform frequency-dependent gain comprises applying a greater gain to higher frequency electrical signals and applying a lower gain to lower frequency electrical signals.

10. The method of claim 1, wherein the cable comprises seven conductors.

11. The method of claim 1, wherein the telemetry data received by the first transceiver module corresponds to properties of a subterranean region.

12. The method of claim 1, wherein the telemetry data received by the first transceiver module corresponds to properties of the downhole tool.

13. A method of transmitting telemetry data, comprising:
- receiving, by first transceiver module, the telemetry data from a downhole logging module of a downhole tool;
- encoding, by the first transceiver module, the telemetry data received by the first transceiver module as at least two channels of independent data;
- applying electrical signals, by the first transceiver module, to conductors of a downhole cable based on the encoded telemetry data, wherein said applying the electrical signals comprises:
- said applying the electrical signals corresponding to the encoded telemetry data for a first channel of the at least two channels of independent data to at least a first one of the conductors of the downhole cable according to a first transmission mode, and
- said applying the electrical signals corresponding to the encoded telemetry data of a second channel of the at least two channels of independent data to at least a second one of the conductors of the downhole cable according to a second transmission mode; transmitting, by the first transceiver module, the electrical signals corresponding to the encoded telemetry data for the first channel in the first transmission mode and the electrical signals corresponding to the encoded telemetry data for the second channel in the second transmission mode over the downhole cable to a second transceiver module at an opposite end of the downhole cable;
- detecting, by the second transceiver module, the electrical signals transmitted by the first transceiver module;
- canceling, by the second transceiver module, crosstalk interference induced on the conductors of the downhole cable; and
- decoding, by the second transceiver module, the detected electrical signals with the crosstalk interference canceled,
- wherein the first transmission mode is orthogonal to the second transmission mode.

14. The method of claim 13, wherein said encoding the telemetry data received by the first transceiver from the downhole tool comprises said encoding the telemetry data as at least four channels of independent data, wherein said applying the electrical signals by the first transceiver further comprises:
- Said applying the electrical signals corresponding to the encoded telemetry data for a third channel of the at least four channels of independent data to at least a third one of the conductors of the downhole cable according to a third transmission mode; and
- Said applying the electrical signals corresponding to the encoded telemetry data of a fourth channel of the at least four channels of independent data to at least a fourth one of the conductors of the downhole cable according to a fourth transmission mode,
- wherein the third transmission mode is orthogonal to the fourth transmission mode.

15. The method of claim 13, wherein said canceling the crosstalk interference by the second transceiver module comprises:
- determining a model for crosstalk interference between the electrical signals of the first transmission mode and the electrical signals of the second transmission mode;
- determining a matrix comprising estimated channel information based on the model;
- applying a QR decomposition to the matrix to obtain decomposed matrices; and
- canceling crosstalk interference based on the decomposed matrices.

16. The method of claim 13, wherein said canceling the crosstalk interference by the second transceiver module comprises:
- determining a model for crosstalk interference between the electrical signals of the first transmission mode and the electrical signals of the second transmission mode;
- determining a matrix comprising estimated channel information based on the model;
- applying a sorted QR decomposition to the matrix to obtain decomposed matrices; and canceling crosstalk interference based on the decomposed matrices.

17. A telemetry system comprising:
- a cable comprising a plurality of conductors;
- a transmitter module coupled to one end of the cable comprising:
- a receiver arranged to receive telemetry data from a downhole module of a downhole tool;
- an encoder arranged to encode the telemetry data received by the receiver from the downhole tool as at least two channels of independent data; and
- a signal generator coupled to input portions of the conductors, the signal generator arranged to apply electrical signals to the conductors based on the encoded telemetry data,
- wherein the signal generator is arranged to:
- said apply the electrical signals corresponding to the encoded telemetry data of a first channel of the at least two channels of independent data to a first plurality of the conductors for transmission over the cable, and
- said apply the electrical signals corresponding to the encoded telemetry data of a second channel of the at least two channels of independent data to a second plurality of the conductors different than the first plurality of the conductors for transmission over the cable; and
- a receiver module coupled to another end of the cable comprising:

a signal detector coupled to output portions of the conductors, the signal detector arranged to detect the electrical signals transmitted by the transmitter module over the cable;

a signal processor configured to cancel crosstalk interference induced on the first and second plurality of conductors of the cable; and a decoder arranged to decode the detected electrical signals with the crosstalk interference canceled, wherein the telemetry system is a downhole telemetry system.

18. The system of claim 17, wherein the first plurality of the conductors comprises two conductors.

19. The system of claim 18, wherein the signal generator is arranged to apply:
   to one conductor of the first plurality of the conductors, an electrical signal having a first polarity corresponding to the encoded telemetry data of the first channel; and
   to another one of the conductors of the first plurality of the conductors, an electrical signal having a second polarity corresponding to the encoded telemetry data of the first channel, the second polarity being opposite the first polarity.

20. The system of claim 17, wherein the second plurality of the conductors comprises two conductors.

21. The system of claim 20, wherein the signal generator is arranged to apply:
   to one conductor of the second plurality of the conductors, an electrical signal having a first polarity corresponding to the encoded telemetry data of the second channel; and
   to another one of the conductors of the second plurality of conductors, an electrical signal having a second polarity corresponding to the encoded telemetry data of the second channel, the second polarity being opposite the first polarity.

22. The system of claim 17, wherein said canceling the crosstalk interference comprises:
   determining a model for crosstalk interference between the first plurality of the conductors and the second plurality of the conductors:
   determining a matrix comprising estimated channel information based on the model;
   applying a QR decomposition to the matrix to obtain decomposed matrices; an
   canceling crosstalk interference based on the decomposed matrices.

23. The system of claim 17, wherein said canceling the crosstalk interference comprises:
   determining a model for crosstalk interference between the first plurality of the conductors and the second plurality of the conductors;
   determining a matrix comprising estimated channel information based on the model; applying a sorted QR decomposition to the matrix to obtain decomposed matrices; and canceling crosstalk interference based on the decomposed matrices.

24. The system of claim 17, wherein the transmitter module is configured to apply a non-uniform frequency-dependent gain to the electrical signals prior to the transmission of the electrical signals over the cable to the receiver module.

25. The system of claim 24, wherein the transmitter module is configured to apply a greater gain to higher frequency electrical signals and apply a lower gain to lower frequency electrical signals.

26. The system of claim 17, wherein the encoder is arranged to encode the telemetry data received by the receiver from the downhole tool as at least three channels of independent data, and wherein the signal generator is arranged to apply electrical signals corresponding to encoded telemetry data of a third channel to a third plurality of the conductors different than the first and second plurality of the conductors.

27. The system of claim 17, wherein the cable comprises seven conductors.

* * * * *

UNITED STATES PATENT AND TRADEMARK OFFICE
CERTIFICATE OF CORRECTION

PATENT NO. : 10,208,588 B2
APPLICATION NO. : 15/327756
DATED : February 19, 2019
INVENTOR(S) : Thanh Tran et al.

It is certified that error appears in the above-identified patent and that said Letters Patent is hereby corrected as shown below:

In the Specification

Column 8, Line 51, delete "H=QR=[$q_{11}/q_{21}$ $q_{12}/q_{22}$] [$r_{11}/0$ $r_{12}/r_{22}$]," and insert $$H = QR = \begin{bmatrix} q_{11} & q_{12} \\ q_{21} & q_{22} \end{bmatrix} \begin{bmatrix} r_{11} & r_{12} \\ 0 & r_{22} \end{bmatrix},$$

In the Claims

Claim 22, Column 24, Line 7, after --decomposed-- delete "matrices; an" and insert --matrices; and--

Signed and Sealed this
Twenty-third Day of April, 2019

Andrei Iancu
*Director of the United States Patent and Trademark Office*